L. E. WATERMAN.
CLUTCH MECHANISM.
APPLICATION FILED OCT. 18, 1910.
1,077,497.
Patented Nov. 4, 1913.
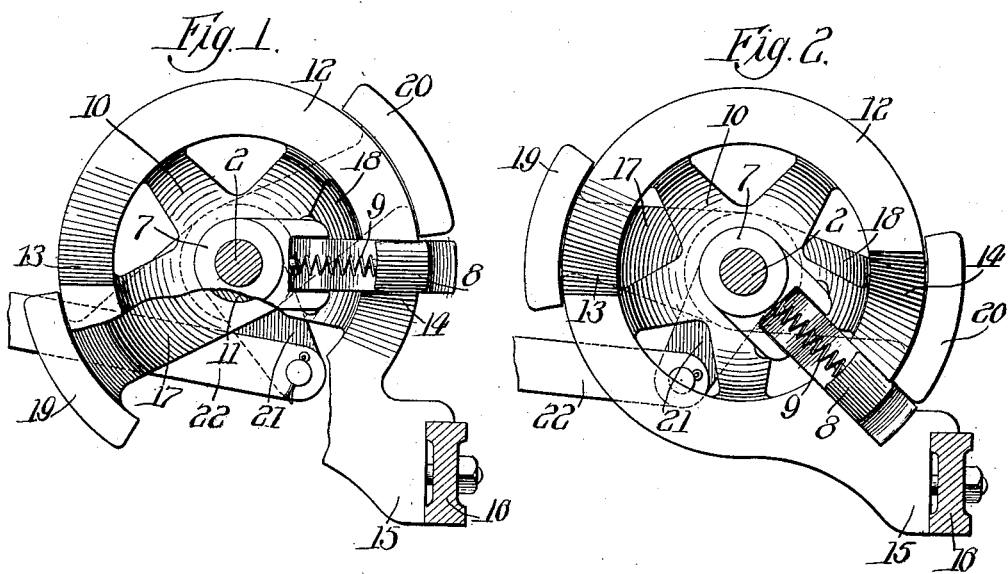
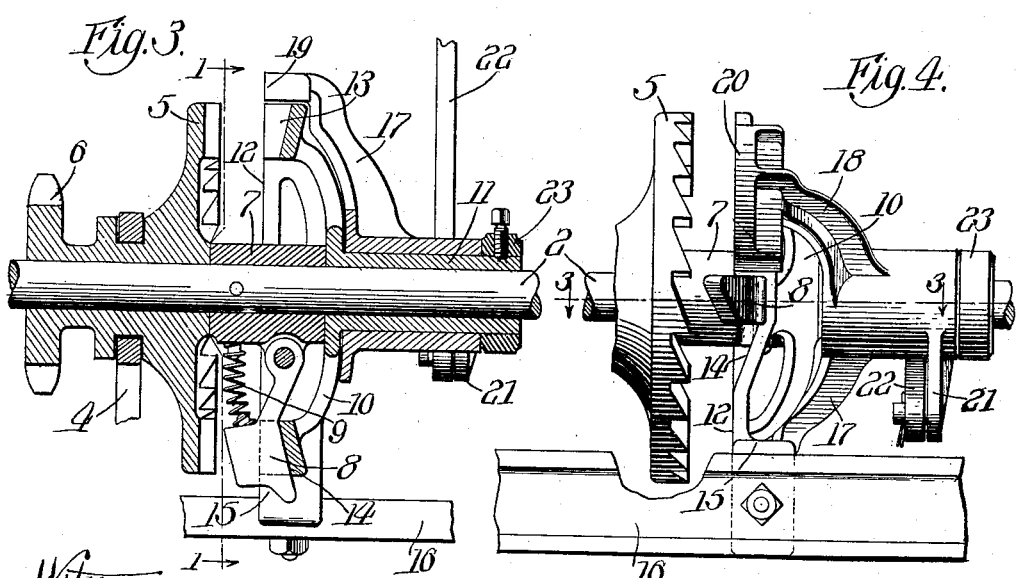
Witnesses:
John T. McCanna Jr.
B. B. Cox
Inventor:
Lewis E. Waterman
By A. O. Behel
Atty.
COLUMBIA PLANOGRAPH CO., WASHINGTON, D. C.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CLUTCH MECHANISM.

1,077,497. Specification of Letters Patent. Patented Nov. 4, 1913.

Application filed October 18, 1910. Serial No. 587,758.

*To all whom it may concern:*

Be it known that I, LEWIS E. WATERMAN, a citizen of the United States, residing at Rockford, in the county of Winnebago and State of Illinois, have invented certain new and useful Improvements in Clutch Mechanisms, of which the following is a specification.

This invention relates to a clutch mechanism adapted to be used in a corn-planter, but which can be used for other purposes where an intermittent rotary movement is to be obtained from a constantly rotary movement.

In a corn-planter the clutch mechanism is placed on the seed-dropper shaft, the clutch being either manually operated or operated by the common check row wire method, a knob on the wire automatically putting the clutch in operation, thus a plurality of such knobs giving said seed-dropper shaft an intermittent movement.

In the accompanying drawing: Figure 1 is a fragmentary sectional view taken on the line 1—1 of Fig. 3, and shows the clutch in its normal or inoperative position. Fig. 2 is a section on the line 1—1 of Fig. 3 and shows the parts moved to an operative position. Fig. 3 is a horizontal section on the line 3—3 of Fig. 4. Fig. 4 is a side elevation of the clutch mechanism.

The clutch mechanism is located on a shaft 2, which when rotated, operates a seed-dropping mechanism. Loosely mounted on the shaft 2, and held from lateral movement by the bifurcated arm 4, is the combined ratchet-wheel 5 and sprocket-wheel 6, which is adapted to be continuously driven by means of an endless-chain run to the driving wheel of the planter.

A collar 7 is fixedly secured to the shaft 2, adjacent the ratchet-wheel 5, and carries a dog 8 which is adapted to be engaged in a driving connection with the teeth of the ratchet-wheel 5, and which is held yieldingly out of engagement therewith, by a coiled-spring 9.

Located loosely on the shaft 2, adjacent the collar 7, is the disk-member 10, having an elongated sleeve 11, and a circumferential face 12, said face having two diametrically opposite depressions having cam surfaces 13 and 14, into one of which the dog 8 is adapted to rest when inoperative; the disk-member 10 being held stationary and from lateral movement by an extending bracket portion 15 bolted to a stationary I-beam of the planter.

Loosely mounted on the sleeve 11 is a rocking-member having oppositely extending arms 17 and 18, which carry at their outer ends face plates or rims 19 and 20 respectively, whose faces form a continuation of the face 12 where said face is broken by the depressions 13 and 14, the continuous face being formed when the rocking-member is rocked as in Fig. 2. The collar 23 holds said member from lateral movement. The rocking-member is rocked by any suitable means, having here shown a depending arm 21 to which is pivotally connected a link 22, said link receiving its movement by any suitable means.

The operation of the clutch mechanism is as follows: Ratchet-wheel 5 is being continuously driven from the driving-wheels of the planter, the dropper-actuating shaft 2 remaining stationary. The clutch in its inoperative position is shown in Fig. 1, and when the link 22 is operated, the parts assume a position as shown in Fig. 2, that is, the rocking-member is rocked, its face plate or rim 20 contacting the dog 8, thus moving said dog longitudinally on the cam-faced depression 14 and in such movement the dog will be moved laterally by the cam face 14 of the depression into engagement with one of the teeth of the rotating ratchet-wheel 5. Since the dog 8 through the collar 7, is secured to the shaft 2, said shaft is rotated with the ratchet-wheel, thereby operating the seed-dropping mechanism with which said shaft connects. If the rocker-member is held in this position (Fig. 2), it will be seen that a continuous surface 12, 19, 20 is formed, allowing the seed-dropper shaft 2 to rotate continuously with the ratchet-wheel 5. As soon as the rocker-member is returned to its normal position, the dog 8 will travel around until it comes to the first depression, into which it will drop by force of the spring 9, thus disconnecting the driving ratchet-wheel and the shaft 2. The rocking-member and means for operating it, is to be used when the seed is to be planted in continuous rows, as the seed-dropper shaft is then rotating continuously, or it can be used to operate said seed-dropper shaft intermittently, as desired, but when planting in hills the knobs on the check row wire, through suitable means, rotate the shaft 2 enough to carry the dog 8 out of the depression and into engagement with the rotating ratchet-wheel. It will be seen that the dog will travel, held in engagement with said ratchet-wheel by the face 12, for half of a revolution, that is, until the dog comes to the next depression, into which it will be forced, thus stopping the rotation of the shaft 2 and likewise the operation of the seed-dropping mechanism.

I claim as my invention:

1. In a clutch mechanism, the combination of a continuously rotating clutch-member, a stationary disk-member having diametrically oppositely located depressions in its face, a dog adapted to be located in one of said depressions, a rocking-member having oppositely extending arms, means for rocking said rocking-member whereby one of said arms will coöperate with and actuate the dog out of said depression and into engagement with the rotating clutch-member, and means for disengaging the dog to move it from said clutch member.

2. In a clutch mechanism, the combination of a continuously rotating clutch-member, a stationary disk-member having diametrically oppositely located depressions in its face, a dog adapted to be located in one of said depressions, a rocking-member having oppositely extending arms with face-members at the free end of said arms, means for rocking said rocking-member, thereby moving said face-members to a position opposite said depressions and forming a continuous face to allow said dog to be continuously rotated with the clutch member, and means for disengaging the dog from said clutch member.

3. In a clutch mechanism, the combination of a shaft having mounted thereon, a loosely mounted continuously rotating clutch-member, a loosely mounted stationary disk-member having oppositely located depressions in its face, and a fixedly secured member carrying a dog adapted to be located in one of said depressions, a rocking-member loosely mounted concentric with the shaft and having oppositely extending arms with face-members at the free end of the arms one of the face-members coöperable with the dog, means for rocking the rocking-member, whereby one of said face-members will actuate the dog to move it out of said depression and into engagement with the rotating clutch-member, thereby rotating said shaft, and means for disengaging the dog from said clutch member.

4. In a clutch mechanism, the combination of a shaft, a continuously rotating clutch-member mounted loosely thereon, a stationary disk-member having oppositely located depressions in its face, said disk-member being stationary and loosely mounted on the shaft, a member fixedly secured to the shaft and carrying a pivotal dog adapted to be located in one of said depressions, means for holding the dog therein, a rocking-member loosely mounted concentric with said shaft and having oppositely extending arms with face-members at the free end of the arms, and means for rocking said rocking-member, thereby moving the face-members to a position opposite said depressions and forming a continuous face to allow said dog to be rotated, thereby rotating said shaft.

5. In a clutch mechanism, the combination of a continuously rotating clutch-member, a stationary disk-member having depressions in its face, an intermittently-operated dog adapted to be located in one of the depressions, means for holding the dog therein, a rocking-member having oppositely extending arms with face-members at the free end of the arms, said face-members located adjacent the rim of the face of said disk-member, and means for rocking the rocking-member whereby one of said face-members will actuate the dog to move it out of said depression and into engagement with the rotating clutch-member, the dog traveling with said clutch-member until a depression is reached into which the dog will be forced.

6. In a clutch mechanism, the combination of a continuously rotating clutch-member, a stationary disk-member having a depression in its face, an intermittently-operated dog adapted to be located in said depression, means for holding the dog therein, an oscillatory-member having an arm with a face-member at the free end of said arm, the oscillatory member being oscillatory in a plane parallel with the plane of rotation of said clutch member to actuate said dog to move it from said depression, and form by its arm a continuous face on said disk member face to allow the dog to be rotated.

7. In a clutch mechanism, the combination of a continuously rotating clutch-member, a stationary disk-member having a depression in its face, an intermittently-operated dog adapted to be located in said depression, means for holding the dog therein, an oscillatory-member having an arm with a face-member that extends over the outer periphery of said disk-member and lies adjacent thereto, said oscillatory member capable of being intermittently oscillated whereby its arm will coöperate with and move the dog out of said depression and into engagement with the rotating member, the face-member simultaneously being moved to a position opposite said depression and forming a continuous face with said disk-member to allow the dog to rotate.

8. In a clutch mechanism, the combination of a continuously rotating clutch-member, a stationary disk-member having diametrically oppositely located depressions in its face, an intermittently-operated dog adapted to be located in one of said depressions, means for holding the dog therein, an oscillatory-member having oppositely extending arms having face-members that extend over the outer periphery of said disk-member and lie adjacent thereto, said oscillatory member capable of being intermittently oscillated, whereby one of its arms will actuate the dog to move it out of said depression and into engagement with the rotating member, the face-members being simultaneously moved to a position opposite said depressions and forming a continuous face with said disk-member to allow the dog to rotate.

In testimony whereof I have hereunto set my hand in presence of two subscribing witnesses.

LEWIS E. WATERMAN.

Witnesses:
A. O. BEHEL,
E. D. E. N. BEHEL.

Copies of this patent may be obtained for five cents each, by addressing the "Commissioner of Patents, Washington, D. C."